United States Patent
Watson et al.

(10) Patent No.: US 8,428,509 B2
(45) Date of Patent: *Apr. 23, 2013

(54) SYSTEM AND METHOD FOR PROVIDING A RICH MEDIA VISITOR LOG

(75) Inventors: Scott Watson, Marina Del Rey, CA (US); Armando Santana, Glendale, CA (US); Orrin J. Shively, Glendale, CA (US); Robert Swirsky, Sunnyvale, CA (US); Jonathan Gilbert, San Francisco, CA (US); Ben Brown, Austin, TX (US)

(73) Assignee: Disney Enterprises, Inc., Burbank, CA (US)

(*) Notice: Subject to any disclaimer, the term of this patent is extended or adjusted under 35 U.S.C. 154(b) by 331 days.

This patent is subject to a terminal disclaimer.

(21) Appl. No.: 12/313,227

(22) Filed: Nov. 17, 2008

(65) Prior Publication Data
US 2009/0233543 A1 Sep. 17, 2009

Related U.S. Application Data

(60) Provisional application No. 61/069,116, filed on Mar. 11, 2008.

(51) Int. Cl.
| | |
|---|---|
| H04H 40/00 | (2008.01) |
| H04H 20/71 | (2008.01) |
| H04L 29/06 | (2006.01) |
| H04M 1/00 | (2006.01) |
| H04M 3/00 | (2006.01) |
| H04W 24/00 | (2009.01) |
| H04W 4/00 | (2009.01) |

(52) U.S. Cl.
USPC ... 455/3.01; 455/3.06; 455/414.3; 455/550.1; 455/418; 455/456.3; 455/466; 348/14.08; 348/14.09; 340/568.1; 725/53; 370/338

(58) Field of Classification Search ............... 455/456.3, 455/3.06, 3.01, 466, 414.3, 550.1, 418; 370/338; 348/14.08, 14.09; 725/53; 340/568.1
See application file for complete search history.

(56) References Cited

U.S. PATENT DOCUMENTS

| | | | |
|---|---|---|---|
| 6,189,783 B1 * | 2/2001 | Motomiya et al. | 235/375 |
| 6,671,807 B1 | 12/2003 | Jaisimha | |
| 7,251,495 B2 | 7/2007 | Keyani | |

(Continued)

OTHER PUBLICATIONS

"Twitter: What are you doing?" 2008 *Twitter*. Jan. 6, 2009 <http://twitter.com/>.

(Continued)

*Primary Examiner* — Bobbak Safaipour
(74) *Attorney, Agent, or Firm* — Farjami & Farjami LLP

(57) ABSTRACT

Presented is a system for providing a rich media visitor log comprising a communications server accessible by members of a group, a local services network interactively connected to the communications server, a group management application resident on the communications server, and a visitor log host application. The group management application is configured to activate a group session, manage communications among group members and the local services network during the group session, and expire activation of the group session after a predetermined time interval. The visitor log host application is configured to collect communications from the communications managed by the group management application, identify exemplary communications for inclusion in the rich media visitor log, select rich media display assets corresponding to the identified exemplary communications, and produce the rich media visitor log comprising the identified exemplary communications and the selected corresponding rich media display assets.

24 Claims, 5 Drawing Sheets

U.S. PATENT DOCUMENTS

| | | | |
|---|---|---|---|
| 7,409,221 B2* | 8/2008 | Obradovich et al. | 455/457 |
| 7,412,042 B2 | 8/2008 | Henry | |
| 7,505,779 B1 | 3/2009 | David | |
| 7,509,124 B2* | 3/2009 | O'Neil | 455/432.2 |
| 7,689,510 B2 | 3/2010 | Lamkin | |
| 7,779,097 B2 | 8/2010 | Lamkin | |
| 7,801,537 B2* | 9/2010 | Matsumoto et al. | 455/456.3 |
| 8,005,460 B2 | 8/2011 | Chen | |
| 8,099,109 B2* | 1/2012 | Altman et al. | 455/456.3 |
| 8,332,402 B2* | 12/2012 | Forstall et al. | 707/736 |
| 2001/0054101 A1 | 12/2001 | Wilson | 709/225 |
| 2002/0068573 A1 | 6/2002 | Raverdy | |
| 2002/0069419 A1 | 6/2002 | Raverdy | |
| 2002/0082897 A1 | 6/2002 | Menelly | |
| 2002/0174003 A1 | 11/2002 | Redmann | |
| 2002/0174248 A1* | 11/2002 | Morriss | 709/238 |
| 2003/0014749 A1* | 1/2003 | Simons et al. | 725/23 |
| 2003/0083889 A1 | 5/2003 | Macklin | |
| 2003/0172090 A1 | 9/2003 | Asunmaa | |
| 2003/0185232 A1 | 10/2003 | Moore | |
| 2003/0191946 A1 | 10/2003 | Auer | |
| 2004/0019513 A1 | 1/2004 | Colalancia | |
| 2004/0019800 A1* | 1/2004 | Tatebayashi et al. | 713/200 |
| 2004/0022227 A1 | 2/2004 | Lynch | |
| 2004/0078341 A1 | 4/2004 | Steichen | |
| 2004/0116115 A1* | 6/2004 | Ertel | 455/426.2 |
| 2004/0158482 A1 | 8/2004 | Hale | |
| 2004/0172315 A1 | 9/2004 | Hale | |
| 2004/0172316 A1 | 9/2004 | Hale | |
| 2004/0181424 A1 | 9/2004 | Hale | |
| 2004/0184593 A1 | 9/2004 | Elsey | |
| 2004/0214600 A1 | 10/2004 | Schechet | |
| 2004/0266408 A1 | 12/2004 | Maes | |
| 2005/0044224 A1 | 2/2005 | Jun | |
| 2005/0060173 A1 | 3/2005 | Hale | |
| 2005/0144642 A1 | 6/2005 | Ratterman | |
| 2005/0202830 A1* | 9/2005 | Sudit | 455/456.1 |
| 2005/0240970 A1 | 10/2005 | Schwalb | |
| 2005/0262530 A1* | 11/2005 | Ruetschi et al. | 725/35 |
| 2005/0266827 A1* | 12/2005 | Kim | 455/411 |
| 2006/0008256 A1 | 1/2006 | Khedouri | |
| 2006/0159109 A1 | 7/2006 | Lamkin | |
| 2006/0189337 A1 | 8/2006 | Farrill | |
| 2006/0230061 A1* | 10/2006 | Sample et al. | 707/103 R |
| 2007/0016584 A1* | 1/2007 | Grell | 707/9 |
| 2007/0032247 A1 | 2/2007 | Shaffer | |
| 2007/0038476 A1 | 2/2007 | Sternlicht | |
| 2007/0136573 A1 | 6/2007 | Steinberg | |
| 2007/0157281 A1* | 7/2007 | Ellis et al. | 725/134 |
| 2007/0161402 A1 | 7/2007 | Ng | |
| 2007/0203763 A1 | 8/2007 | Ackley | |
| 2007/0208664 A1 | 9/2007 | Ortega | |
| 2008/0014911 A1* | 1/2008 | Medved et al. | 455/414.2 |
| 2008/0045192 A1* | 2/2008 | Zhao et al. | 455/414.2 |
| 2008/0189293 A1 | 8/2008 | Strandel | |
| 2008/0201158 A1* | 8/2008 | Johnson et al. | 705/1 |
| 2008/0248781 A1 | 10/2008 | Cedo Perpinya et al. | |
| 2008/0319935 A1 | 12/2008 | Chandak | |
| 2009/0061835 A1 | 3/2009 | Schmidt | |
| 2009/0100480 A1 | 4/2009 | McQuaide | |
| 2009/0156181 A1 | 6/2009 | Athsani | |
| 2009/0163177 A1 | 6/2009 | Bearden | |
| 2009/0204905 A1* | 8/2009 | Toghia | 715/753 |
| 2009/0215469 A1* | 8/2009 | Fisher et al. | 455/456.3 |
| 2009/0233543 A1 | 9/2009 | Watson | |
| 2009/0233639 A1* | 9/2009 | Watson et al. | 455/519 |
| 2009/0234935 A1* | 9/2009 | Watson et al. | 709/219 |
| 2009/0313479 A1 | 12/2009 | Schroeter | |
| 2010/0063866 A1* | 3/2010 | Kinoshita et al. | 705/10 |
| 2010/0080163 A1* | 4/2010 | Krishnamoorthi et al. | 370/312 |
| 2010/0093373 A1* | 4/2010 | Olsson et al. | 455/456.3 |
| 2010/0144328 A1* | 6/2010 | Keating et al. | 455/414.3 |
| 2010/0150120 A1* | 6/2010 | Schlicht et al. | 370/338 |
| 2011/0082639 A1* | 4/2011 | Jung et al. | 701/201 |

OTHER PUBLICATIONS

"Jaiku | Your Conversation." 2008 *Jaika*. Jan. 6, 2009 <http://jaiku.com/>.

Acohido, Byron, *Google's GPhone strategy could keep user costs low*, USATODAY.com., (Oct. 14, 2007).

"3jam SuperTest::Your Free Text Messaging Inbox on the Web." 2009 *3jam, Inc.*. Jan. 6, 2009 <http://www.3jam.com/>.

"Your Social Compass." 2009 *Loopt, Inc*. Jan. 6, 2009. <http://www.loopt.com/>.

"dodgeball.com :: mobile social software." 2009 *Google Inc*. Jan. 6, 2009. <http://www.dodgeball.com>.

"Disney Files Patent for Wireless FastPasses." NETCOT.com. posted Sep. 5, 2007<http://www.netcot.com/thesite/2007/09/05/disney-files-patent-for-wireless-fastpasses/>.

U.S. Appl. No. 12/313,228 Non-Final OA dated Mar. 28, 2011.

U.S. Appl. No. 12/313,228 Resp. to Non-Final OA (as Filed on May 25, 2011).

U.S. Appl. No. 12/313,231 Non-Final OA dated Apr. 1, 2011.

U.S. Appl. No. 12/313,231 Resp. to Non-Final OA (as Filed Jul. 1, 2011).

U.S. Appl. No. 12/313,229 Non-Final OA dated Sep. 22, 2010.

U.S. Appl. No. 12/313,229 Resp. to Non-Final OA (as Filed Dec. 22, 2010).

U.S. Appl. No. 12/313,229 Final OA dated Mar. 14, 2011.

U.S. Appl. No. 12/313,229 RCE and Resp. to Final OA (as Filed on Jun. 13, 2011).

U.S. Appl. No. 12/313,229 Non-Final OA dated Aug. 4, 2011.

U.S. Appl. No. 12/313,228 Non-Final OA dated May 24, 2012.

* cited by examiner

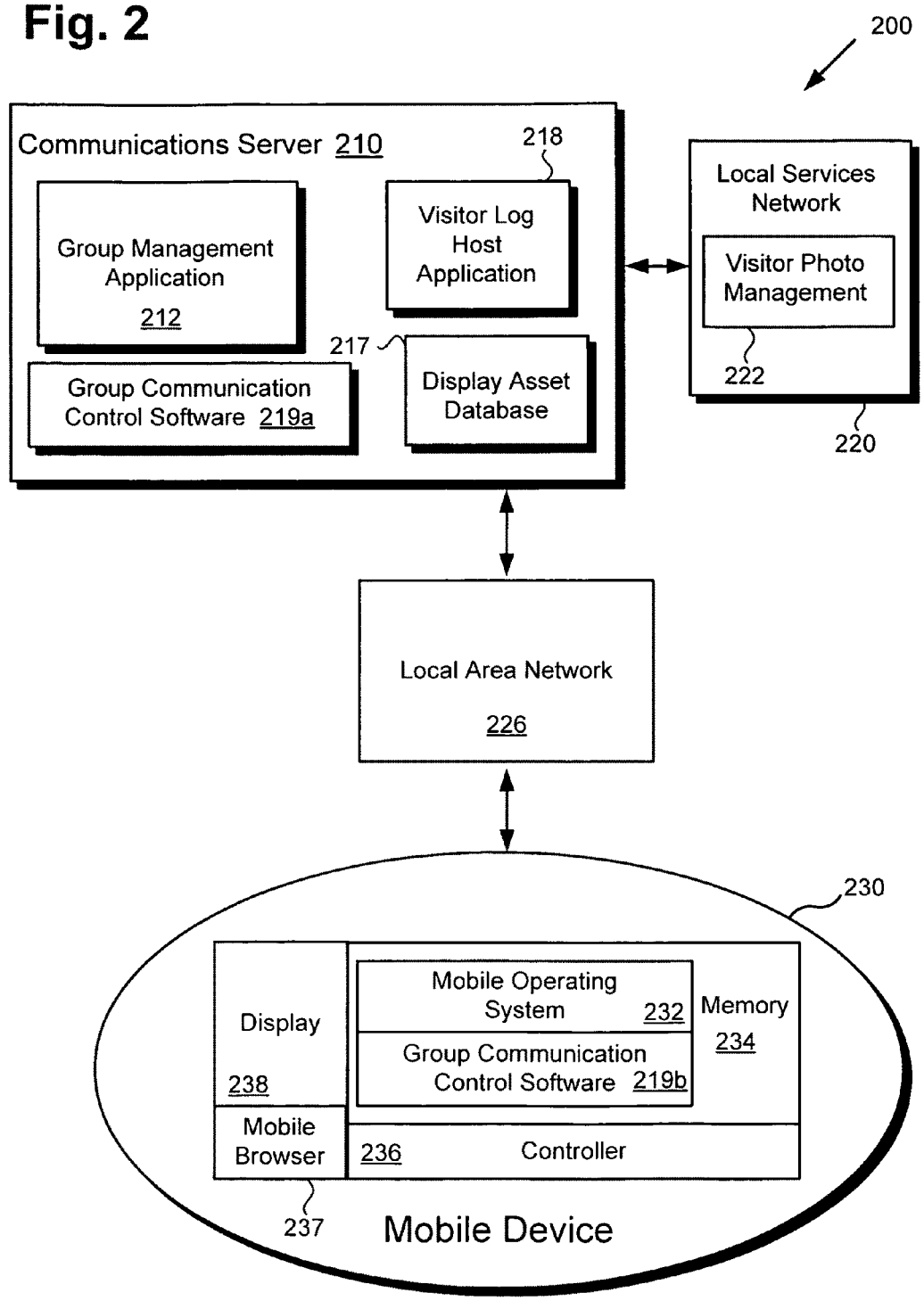

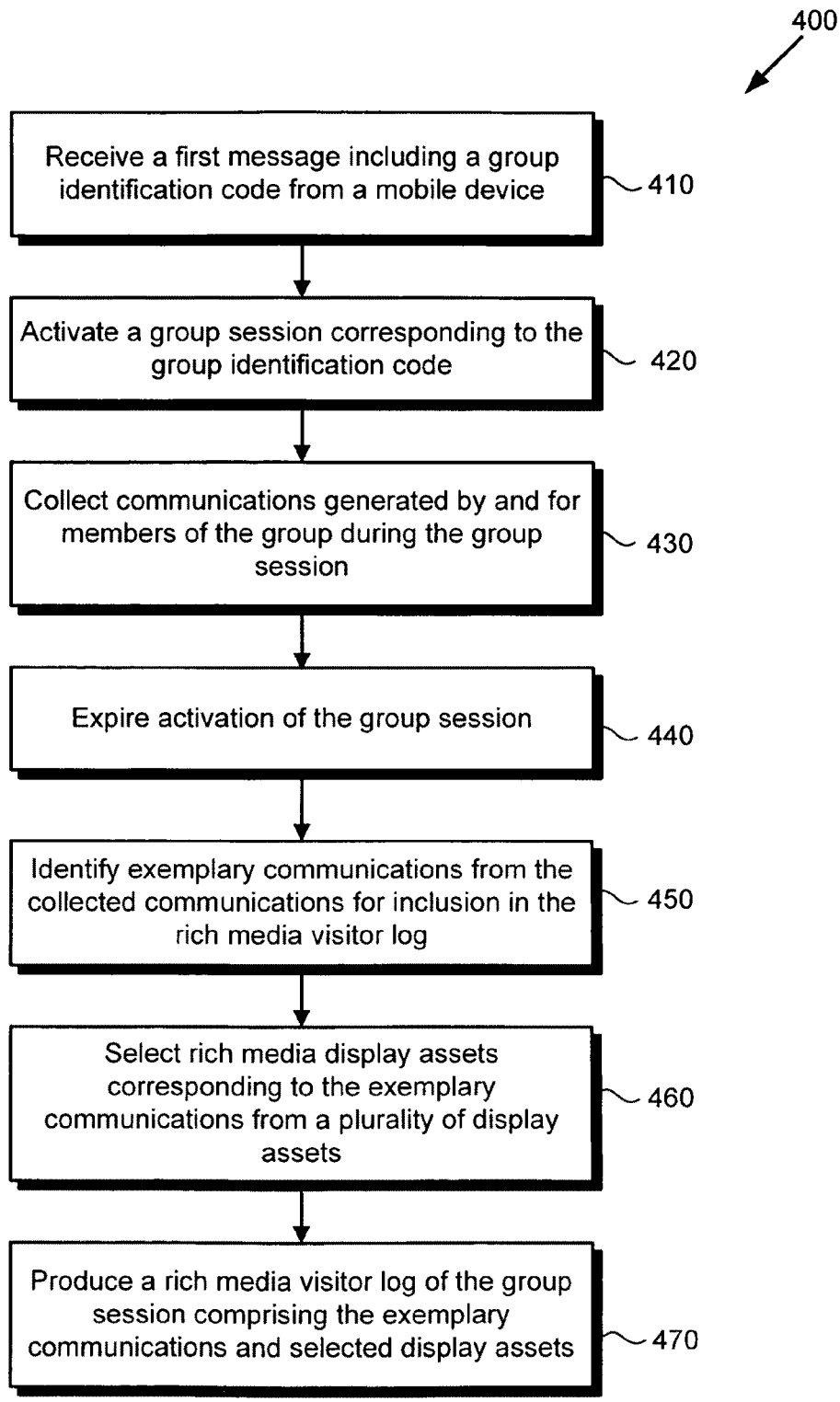

SYSTEM AND METHOD FOR PROVIDING A RICH MEDIA VISITOR LOG

RELATED APPLICATIONS

This application claims priority to U.S. Provisional Application No. 61/069,116, filed on Mar. 11, 2008, which is hereby incorporated by reference in its entirety.

BACKGROUND OF THE INVENTION

1. Field of the Invention

The present invention relates generally to network communications. More particularly, the present invention relates to network mediated delivery of rich media content.

2. Background Art

Photo albums have long been a popular format for commemorating special experiences, such as those arising from group travel or a group visit to a recreational venue. The photo albums assembled to memorialize these special events may sometimes include more than photos. For example, cutouts of map portions may be included to illustrate a travel route or highlight a destination, and dialogue bubbles may accompany personal photographs to convey the significance of a particular event or communicate significant episodes of group interaction.

The conventional approach to celebrating special events through production of a personal photo album devoted to the event includes several disadvantages, however. For example, the content from which the album is assembled is typically limited to content produced by the person assembling the album, or gathered by that individual from other members of the group sharing the common experience. Moreover, as a consequence of its often informal creation, a conventional photo album may convey a somewhat primitive aesthetic, resulting in a less than optimally pleasing artistic product for sharing with others.

In addition, a commemorative album assembled as previously described may actually be difficult to share. Because a physically assembled album is often a singular object, difficult to reproduce, members of the group celebrated by the album must typically be present at a common location to mutually enjoy its contents. Alternatively, the album may be circulated amongst the group members, or to outsiders to the group, eliminating the requirement that all be present in a common location. Unfortunately, circulation prevents the members temporarily dispossessed of the album from enjoying the reminiscences evoked by it, while depriving the outsiders not in possession of the album from appreciating its contents.

A more recent approach to commemorating a special event utilizes the advantages made available by modern communications technology to share digital images corresponding to the event. Widely available computer applications such as Shutterfly, and Kodak EasyShare, for example, enable ready sharing of electronic photos and photo albums among the members of a group, as well as their distribution to outsiders. Because an electronic photo album is much more easily reproduced than a physically assembled album, this approach overcomes the previous obstacles to mutual enjoyment of the commemorative content by all viewers concurrently, independent of their location.

Despite making commemorative digital content easier to share and enjoy, however, the conventional electronic solution to producing a digital photo album continues to place the burden of content production on one or more members of the group participating in the celebrated event. That is to say, the content contained by an electronic photo album is still typically limited to the content produced or gathered by group members. While that content, due to its likely personal significance to the group members, may be satisfactory for sharing among the group, as is true for the physical photo album produced according to the earlier conventional approach, the resulting collection of content may lack the richness and complexity of a professionally produced product, and be less desirable for viewing by outsiders to the group.

As a result of the various described disadvantages associated with conventional approaches to producing a collection of commemorative content, celebrating a special experience through creation of a commemorative album is unnecessarily difficult and inconvenient. Furthermore, because conventional approaches are likely to produce a less than optimally appealing artistic product, sharing enjoyment of the special experience with others may be less satisfying for all parties than if the commemorative album were more professionally produced.

Accordingly, there is a need to overcome the drawbacks and deficiencies in the art by offering a solution capable of providing a professional quality rich media commemorative record of a group event, to celebrate, memorialize, and enable sharing of the event.

SUMMARY OF THE INVENTION

There are provided systems and methods for providing a rich media visitor log, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2 is a block diagram of a system for providing a rich media visitor log, according to another embodiment of the present invention;

FIG. 4 is a flowchart presenting a method for providing a rich media visitor log, according to one embodiment of the present invention.

DETAILED DESCRIPTION OF THE INVENTION

Figure 1:
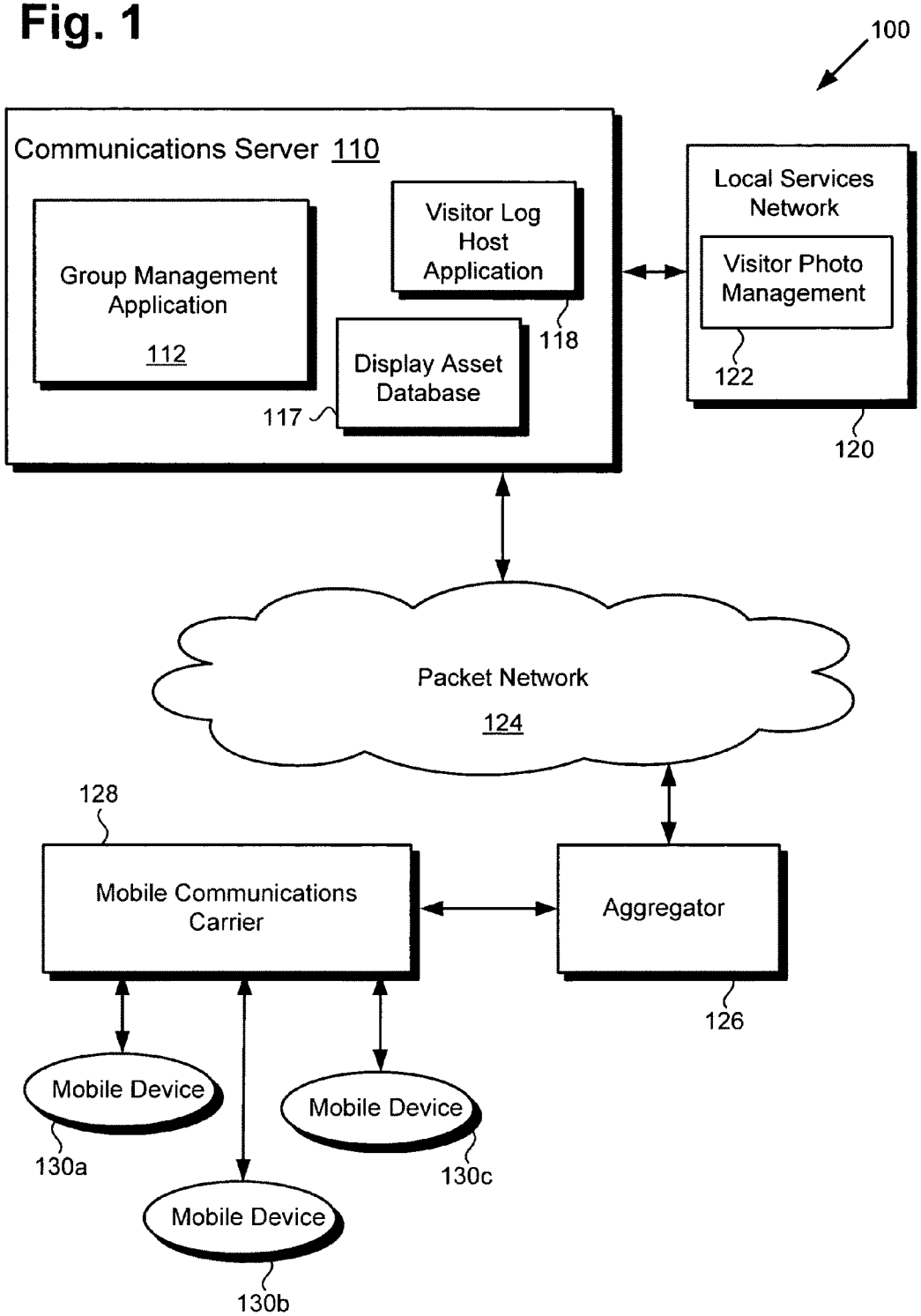
FIG. 1 is a block diagram of a system for providing a rich media visitor log, according to one embodiment of the present invention.

The present application is directed to a system and method for providing a rich media visitor log. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 is a block diagram of system 100 for providing a rich media visitor log, according to one embodiment of the present invention. System 100 includes communications server 110, local services network 120, packet network 124, aggregator 126, mobile communications carrier 128, and mobile communication devices 130a, 130b, and 130c. Communications server 110 may be used to support communication at a recreational venue such as a theme park or destination resort, for example.

As shown in FIG. 1, communications server 110 is interactively linked to local services network 120, which may perform any of numerous information management functions within the recreational venue. For example, local services network 120 may provide updated information relevant to services and amenities available for display and enjoyment by visitors to the recreational venue. In addition, local services network 120 may include rich media production resources, such as professional photography or videography services, for example, to generate rich media content commemorating visitor activities within the venue, as shown by visitor photo management application 122. Also shown in FIG. 1 are group management application 112, display asset database 117, and visitor log host application 118, residing on communications server 110.

According to the embodiment of FIG. 1, group management application 112 on communications server 110 is configured to support communications among mobile communication devices 130a, 130b, and 130c, and local services network 120. Mobile communication devices 130a, 130b, and 130c, respectively, correspond to devices operated by users (not shown in FIG. 1) who are visitors visiting the recreational venue corresponding to local services network 120 as members of a group. For example, a visitor using mobile communication device 130a may activate a group session during which group management application 112 manages communications for the group. The group session may be activated by the visitor sending a messaging opting in to group management provided by group management application 112. The opt-in message may take the form of a short message service (SMS) text message containing a group identification code to communications server 110 via mobile communications carrier 128, for example. As shown in FIG. 1, aggregator 126, which may be a short message service center (SMSC) for example, mediates communication between mobile communications carrier 128 and communications server 110.

In a similar manner, visitors using mobile communication devices 130b and 130c may opt-in to the group session by identifying themselves as belonging to the group including the user of mobile communication device 130a. Subsequently, the users of mobile communication devices 130a, 130b, and 130c, can communicate with all other members of their group substantially simultaneously, in a number of different ways, as shall be described. For example, a user of mobile communication device 130a can send SMS text messages to communications server 110, for distribution by group management application 112 to mobile communication devices 130b and 130c. In addition, the members of the group can utilize group management application 112 to communicate with local services network 120 to, for example, obtain rich media content provided by visitor photo management application 122. Moreover, the members of the group may utilize group management application 112 to exchange communications including rich media content, such as photos, videos, and audio/video mashups produced by members of the group. In addition to providing management of group communications during the group session, group management application 112 may also be configured to expire activation of the group session, for example, after a predetermined time interval has elapsed since its activation.

Visitor log host application 118 is designed to generate a rich media visitor log commemorating the group visit to the recreational venue. Visitor log host application 1 18 may be configured to collect communications from the communications exchanged among mobile communication devices 130a, 130b, 130c, and local services network 120, and managed by group management application 112. Visitor log host application 118 may be further configured to identify exemplary communications for inclusion in a rich media visitor log from the collected communications, select rich media display assets corresponding to the identified exemplary communications from display asset database 117, and produce the rich media visitor log from the identified exemplary communications and the selected rich media display assets.

Although the present embodiment has been described by reference to SMS text messaging, in other embodiments, group messaging may occur via other communication formats. For example, in one embodiment, group communications, such as opt-in messaging and messaging amongst group members, for example, may include exchange of Multimedia Messaging Service (MMS) messages. In other embodiments, communications may occur through mobile Instant Messaging (IM) or other Transmission Control Protocol/Internet Protocol (TCP/IP) channels, enabled by Enhanced Data rates for Global System for Mobile communications (EDGE), Enhanced General Packet Radio Service (EGPRS), or International Mobile Telecommunications Single Carrier (IMT-SC) technologies, for example.

Turning to FIG. 2, FIG. 2 is a block diagram of system 200 for providing a rich media visitor log, according to another embodiment of the present invention. System 200 comprises communications server 210, local services network 220, and mobile communication device 230, corresponding respectively to communications server 110, local services network 120, and any of mobile communication devices 130a, 130b, and 130c, in FIG. 1. Also shown in FIG. 2 are visitor photo management application 222, group management application 212, display asset database 217, and visitor log host application 218, corresponding respectively to visitor photo management application 122, group management application 112, display asset database 117, and visitor log host application 118, in FIG. 1. In addition, in FIG. 2, communications server 210 includes group communication control software 219a, having no analogue in FIG. 1.

As shown in FIG. 2, mobile communication device 230 is in communication with communications server 210 through local area network (LAN) 226, which may be supported by the recreational venue hosting communications server 210, for example. Mobile communication device 230 includes mobile operating system 232 located in memory 234, controller 236, mobile browser 237, and display 238. Also present in memory 234 of mobile communication device 230, is group communication control software 219*b*, corresponding to group communication control software 219*a*, on communications server 210. Mobile communication device 230 may be any device capable of supporting wireless data band communication, such as a suitably configured mobile telephone, personal digital assistant (PDA), digital media player, wireless computer, or wireless gaming console, for example.

According to the present embodiment, group communication control software 219*b* is located in memory 234, having been received from communications server 210 via LAN 226. LAN 226 may comprise a wireless network such as a Wi-Fi, Worldwide Interoperability for Microwave Access (WiMAX), or Bluetooth network, for example. Although in the present embodiment, transfer of group communication control software 219*a* is shown to result from data transfer over LAN 226, in another embodiment communication control software 219*a* may be downloaded over a packet network, such as the Internet, for example. In yet another embodiment, group communication control software 219*a* may be transferred via a wired or wireless connection to a client computer (not shown in FIG. 2). In that embodiment, the client computer serving as the intermediary transfer mechanism for transfer of group communication control software 219*a* may itself receive group communication software 219*a* as a download over a packet network, a transfer over LAN 226, or as an upload from a CD-ROM or other portable computer readable storage medium. Once transferred to mobile communication device 230, group communication control software 219*b* may be stored in memory 234 and run locally on mobile communication device 230.

Controller 236 may be the central processing unit for mobile communication device 230, for example, in which role controller 236 runs mobile operating system 232, launches mobile browser 237, and facilitates execution of group communication control software 219*b*. Web browser 237, under the control of controller 236, may be used to enable a user of mobile communication device 230 to view communications content distributed by group management application 212 running on communications server 210.

As was the case for system 100 in FIG. 1, in FIG. 2, communications server 210 is configured to manage communications among mobile communication device 230, mobile communication devices operated by other members of the group including mobile communication device 230, and local services network 220. In the implementation shown in FIG. 2, group communication control software 219*b* running on mobile communication device 230 enables the visitor operating that device to access group management application 212. As a result, mobile communication device 230 may be utilized by a visitor to engage in group communications with other members of his or her group, as well as access network assets.

Similarly, as in FIG. 1, in FIG. 2, visitor log host application 218 may be configured to collect communications from the communications exchanged among mobile communication device 230, other group members, and local services network 220, managed by group management application 212. Visitor log host application 218 may also be further configured to identify exemplary communications for inclusion in a rich media visitor log from the collected communications, select rich media display assets corresponding to the identified exemplary communications from display asset database 217, and produce the rich media visitor log from the identified exemplary communications and the selected rich media display assets.

Figure 3A:
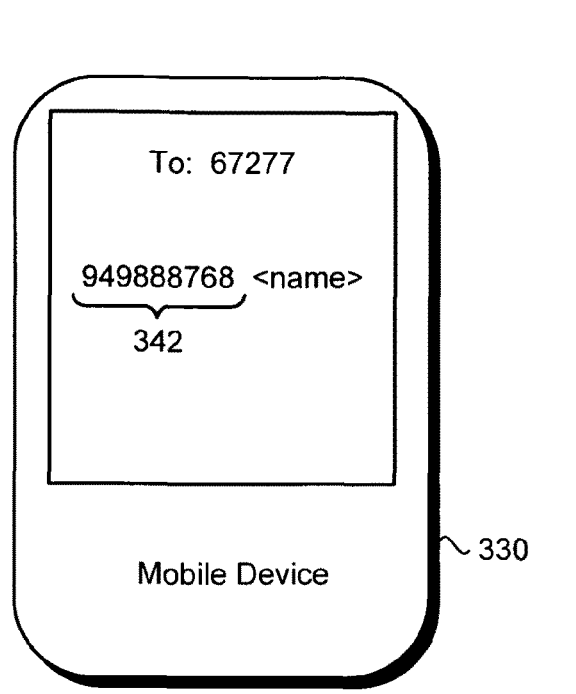
FIG. 3A shows a visual frame of a mobile communication device display corresponding to entry of a group identification code, according to one embodiment of the present invention.
Figure 3B:
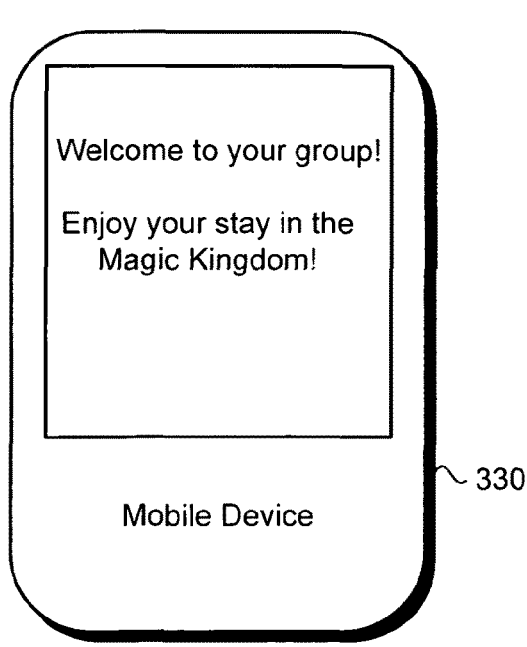
FIG. 3B shows a visual frame of a confirmation message sent by a communications server running a group management application, according to one embodiment of the present invention.

As previously noted, the systems shown in FIGS. 1 and 2 may be used to produce a rich media visitor log commemorating a group visit to a recreational venue such as a theme park or destination resort, for example. Those aspects of the present invention will now be further described by reference to FIGS. 3A, 3B, 4, and 5, in addition to FIG. 1. FIG. 3A shows visual frame 300*a* of a mobile communication device display corresponding to entry of a group identification code, according to one embodiment of the present invention, while FIG. 3B shows exemplary visual frame 300*b* of a confirmation message sent by a communications server running a group management application. Mobile communication device 330 corresponds to any of mobile communication devices 130*a*, 130*b*, and 130*c*, in FIG. 1.

Figure 5:
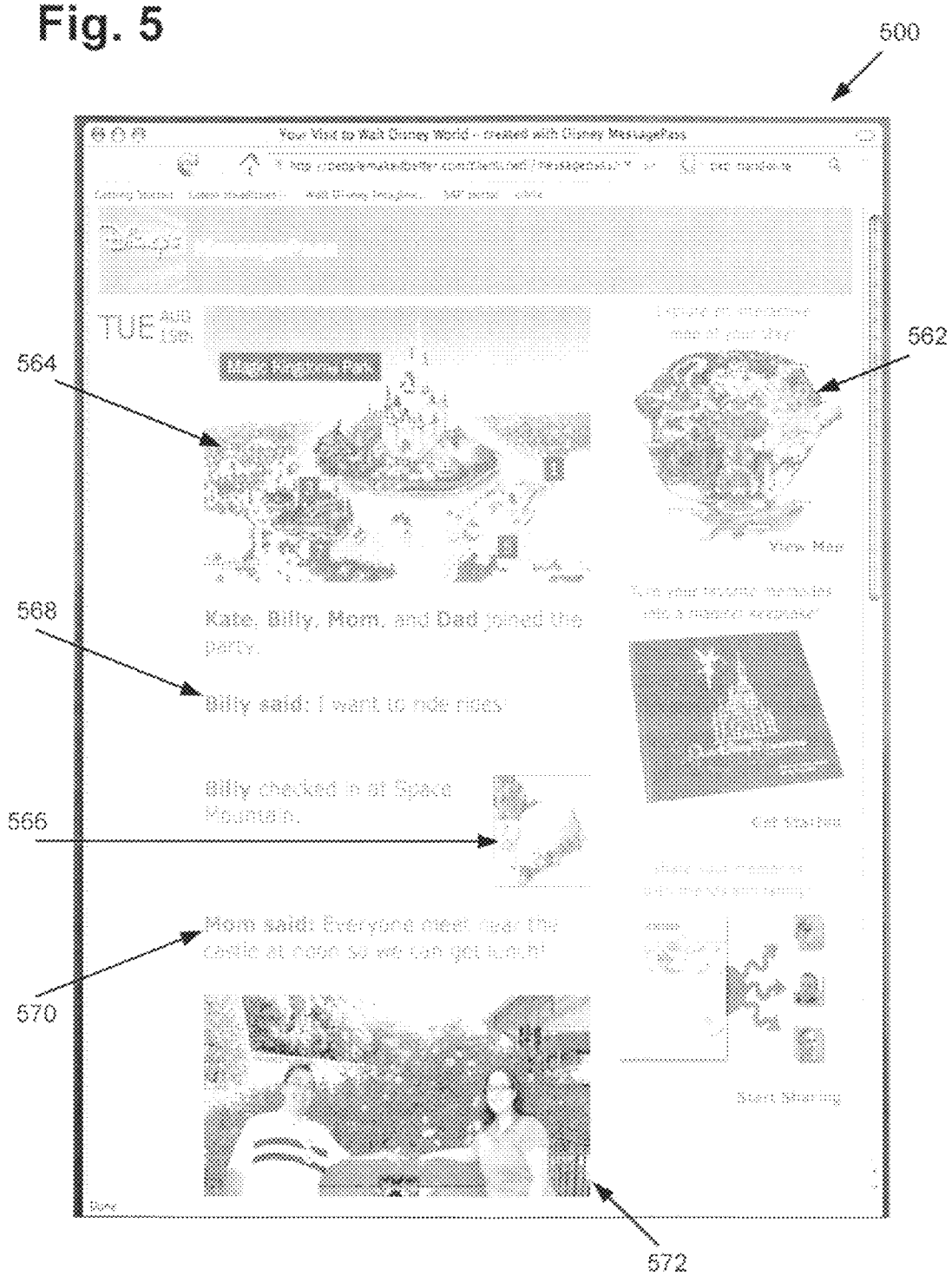
FIG. 5 is a visual frame depicting a portion of an example rich media visitor log, provided according to one embodiment of the present invention.

Skipping ahead to FIG. 5 for a moment, FIG. 5 shows visual frame 500 of a rich media visitor log hosted as a web page, according to one embodiment of the present invention, while FIG. 4 presents a flowchart of a method for providing a rich media visitor log that might include visual frame 500. It is noted that although for clarity of presentation, the following description focuses on the system shown FIG. 1, the system of FIG. 2 is fully capable of providing a rich media visitor log in the manner described.

Turning to FIG. 4, FIG. 4 shows flowchart 400 describing the steps, according to one embodiment of the present invention, of a method for providing a rich media visitor log. Certain details and features have been left out of flowchart 400 that are apparent to a person of ordinary skill in the art. For example, a step may comprise one or more substeps or may involve specialized equipment or materials, as known in the art. While steps 410 through 470 indicated in flowchart 400 are sufficient to describe one embodiment of the present method, other embodiments may utilize steps different from those shown in flowchart 400, or may include more, or fewer steps.

Referring to step 410 of flowchart 400 in conjunction with FIGS. 1, 3A, and 5, step 410 comprises receiving a first message including a group identification code sent from a mobile communication device. Step 410 corresponds, for example, to receipt at communications server 110, in FIG. 1, of an opt-in message like that shown in visual frame 300*a*, sent from mobile communication device 130*a*, 130*b*, or 130*c*. Further description of the steps shown in flowchart 400 will proceed within the context of the exemplary group visit represented in FIG. 5, in which a group comprising Kate, Billy, Mom, and Dad visit Disney's Magic Kingdom.

Upon entry into the Magic Kingdom, the group may be provided with documentation explaining the features and operation of the available services for managing group communications within the park. The documentation may include a group identification code that may be used in common by the users of mobile communication devices 130*a*, 130*b*, and 130*c*, for example, three members of the group including Kate, Billy, Mom, and Dad. The group identification code may take the form of a printed alphanumeric code, requiring manual entry into the respective mobile communication devices, or a radio frequency identification (RFID) tag readable by mobile communication device 130*a*, 130*b*, and 130, for example. In one embodiment, a protocol for assigning group identification codes assures that sequential codes are not assigned to successive visitors, or groups of visitors, entering the park, in order to prevent one visitor or group from successfully anticipating the group identification code assigned to another visitor or group, and intercepting or intruding into that other group's communications.

Step 410 is performed when a first message sent by any member of the group opts in to group management by providing communications server 110 with the group identification code issued to the group of Kate, Billy, Mom, and Dad. As in the embodiment of FIG. 3A, a first message may be a text message sent to a number corresponding to group management application 112, i.e. 67277 in that figure. The contents of the text message may include group identification code 342 and the name by which the user of mobile communication device 330 wishes to be known in the park. Let us assume that a first message similar to the message shown in FIG. 3A is sent by Dad. Receipt of that first message at communications server 110 occurs at step 410 of flowchart 400. Although the embodiment represented by FIG. 3A depicts the opt-in message as a text message, that depiction is merely exemplary. In other embodiments, for example, opting in may be performed by activating a group identification code by means of barcode scanning, fingerprint or other biometric scanning, or through use of a smart-card device, for example.

The exemplary method of flowchart 400 continues with step 420, which comprises activating a group session corresponding to group identification code 342. Step 420 may be performed on communications server 110, for example, using group management application 112 and referring to a plurality of pre-authorized group identification codes available on communications server 110. Activating a group session in step 420 may comprise confirming that group identification code 342 is a valid code and initiating activation of the group session. As mentioned earlier, in some embodiments, a group session is associated with a predetermined activation period. In those embodiments, step 420 may additionally correspond to verification that the activation period for the group session has not been previously tolled. Although not represented in FIG. 4, in some embodiments the method of flowchart 400 may include providing a confirmation message to the mobile communication device from which the group identification code was received in step 410. In that embodiment, as shown by FIG. 3B, a confirmation message may comprise a simple welcome greeting and felicitation.

Flowchart 400 continues with step 430, comprising collecting communications generated by and for members of the group during the group session. Having received a first message opting in to group management in step 410, and having activated a group session corresponding to group identification code 342 in step 420, the group may be enlarged by the receipt at communications server 110 of additional opt-in messages from Kate, Billy, and Mom. During a group session, messages generated by or for group members are collected for possible inclusion in a rich media visitor log commemorating the group session. Messages collected in step 430 may include opt-in messages from members of the group, communications among members of the group by means of group management application 112, exchange of rich media content among group members, retrieval and distribution of rich media content from local services network 120, and any communication containing information with regards to the location or activities of the group members. Collection of group communications on communications server 110 can continue as communications among group members occurs, during activation of the group session.

Continuing with step 440 of flowchart 400, step 440 comprises expiring activation of the group session. As previously remarked, in some embodiments, the group session for which activation is activated in step 420 is associated with a predetermined activation period. For example, a group session initiated as the result of entry into a theme park may be limited in time to an eighteen or twenty four hour window, at the end of which the group session is automatically terminated. A predetermined activation period may be determined to enable group communication in-park, but be of a duration making it unlikely that visitors will be able to continue group communication using the resources on communications server 110 after their group in-park experience has ended. In some embodiments the users of communication devices 130a, 130b, and 130c may be provided a means for ending their respective participation in the group session voluntarily, prior to the system imposed expiration of the activation period. In those embodiments, termination of the group session may occur when the participation of all group members has voluntarily ended.

Moving now to step 450 of flowchart 400, step 450 comprises identifying exemplary communications from the communications collected in step 430 for inclusion in the rich media visitor log. In one embodiment, identifying exemplary communications in step 450 may be an automated process, executed by visitor log host application 118. In other embodiments, identifying exemplary communications for inclusion in the rich media visitor log may include human input from, for example, one or more group members, or a human expert with editorial authority over the contents of the rich media visitor log. In some embodiments identifying exemplary communications for inclusion in the rich media visitor log may include filtering the collected communications in order to suppress or redact those communications containing inappropriate content, due to their subject matter or mode of expression, for example.

Continuing with step 460 of flowchart 400, step 460 comprises selecting rich media display assets corresponding to one or more of the identified exemplary communications from a plurality of display assets accessible to visitor log host application 118 on display asset database 117. The plurality of display assets may include rich media assets local to communications server 110, for example, maps or images corresponding to popular locations in-park, or imported display assets. Imported display assets may include rich media content exchanged between group members through use of group management application 112, as well as rich media content generated in-park through local services network 120. Where a communication from a group member comprises a message checking in at a specific park location, for example, a corresponding display asset may be text describing that action, and/or a graphical element depicting the locale. Alternatively, where a communication is provided for the members of the group comprising a notification message of the availability of rich media content retrieved from local services network 120, a corresponding display asset may be the rich media content retrieved.

In step 470 of flowchart 400, the exemplary communications identified in step 450 and the corresponding rich media display assets selected in step 460 are used to produce a rich media visitor log of the group session. As was the case in step 450, in some embodiments, producing the rich media visitor log in step 470 may be an automated process performed by visitor log host application 118. In other embodiments, however, producing the rich media guest log may include input, such as design input, for example, from a human producer.

Although not shown in flowchart 400 of FIG. 4, in some embodiments a method for providing a rich media visitor log may further comprise hosting the rich media visitor log, as a web page for instance. Hosting a rich media guest log accessible to group members after expiration of a group session commemorates the joint experience and allows group members and their friends to celebrate the experience after the fact.

Referring to FIG. 5, visual frame 500 shows an image of the rich media visitor log celebrating the visit of Kate, Billy, Mom, and Dad, to the Magic Kingdom. Visual frame 500 includes rich media display assets corresponding to the park venue, for example property map 562, and graphical images 564 and 566 of the Magic Kingdom and locales within it. In addition, visual frame 500 includes several imported display assets, representing communications generated by or for Kate, Billy, Mom, or Dad during their group session. Imported display assets include message content such as Billy's message 568 stating his desire to ride rides, and Mom's message 570 directing the group to meet for lunch. Visual frame 500 also includes a display asset corresponding to rich media photo 572, which may be contained in a communication exchanged between group members, i.e. an item of rich media content produced by a member of the group, or may be content retrieved from the local services network present in-park. Thus, by collecting communications generated by or for group members during a group session, producing a rich media visitor log from those communications, and perhaps hosting the rich media visitor log for access by the group members and/or others after expiration of the group session, the present application discloses a system and method for commemorating and sharing the enjoyment derived from the group experience.

From the above description it is manifest that various techniques can be used for implementing the present concepts without departing from their scope. Moreover, while the present application has provided a disclosure with specific reference to certain embodiments, a person of ordinary skills in the art would recognize that changes can be made in form and detail without departing from the spirit and the scope of the inventive concepts described. As such, the present embodiments are to be considered in all respects as illustrative and not restrictive. It should also be understood that other embodiments are not limited to the particular implementational details described herein, but are capable of many rearrangements, modifications, and substitutions without departing from the disclosed inventive concepts.

What is claimed is:

1. A system for providing a rich media visitor log to groups of visitors of a recreational venue, the system comprising:
    a communications server accessible by a group including a user of a first mobile communication device, and a user of a second mobile communication device;
    a local services network interactively connected to the communications server;
    a group management application resident on the communications server, the group management application configured to receive an identification code assigned to the group and activate a group session corresponding to the identification code assigned to the group, manage communications among the first mobile communication device, the second mobile communication device, and the local services network during the group session, and expire activation of the group session after a predetermined time interval;
    a visitor log host application configured to collect communications from the communications managed by the group management application, identify exemplary communications for inclusion in the rich media visitor log, select rich media display assets corresponding to the identified exemplary communications, and produce the rich media visitor log comprising the identified exemplary communications and the selected corresponding rich media display assets;
    wherein sequential identification codes are not assigned to successive groups of the groups of visitors to the recreational venue, thereby preventing one to anticipate the group identification code assigned to the group.

2. The system of claim 1, wherein the rich media display assets corresponding to the identified exemplary communications comprise rich media content produced by the local services network.

3. The system of claim 1, wherein the rich media display assets corresponding to the identified exemplary communications comprise rich media content produced by members of the group.

4. The system of claim 1, wherein the system is further configured to host the rich media visitor log for display to members of the group after expiration of the group session.

5. The system of claim 4, wherein the rich media visitor log is hosted as a web page.

6. The system of claim 1, wherein the group management application is configured to support communications via one of short message service (SMS) text messaging, email, Multimedia Messaging Service (MMS) messaging, and Instant Messaging (IM).

7. The system of claim 1, further comprising a group communication control software capable of being downloaded to the first mobile communication device and the second mobile communication device; the group communication control software configured to enable communication among the communications server, the local services network, and the group including the first mobile communication device and the second mobile communication device over a local area network (LAN).

8. The system of claim 7, wherein the LAN is one of a Wi-Fi network, a Worldwide Interoperability for Microwave Access (WiMAX) network, and a Bluetooth network.

9. The system of claim 1, wherein the system is implemented to provide a rich media visitor log commemorating a group visit to a venue corresponding to the local services network.

10. The system of claim 9, wherein the venue comprises one of a theme park and a destination resort.

11. A method for providing a rich media visitor log to groups of visitors of a recreational venue, the method comprising:
    receiving a first message including a group identification code sent from a mobile communication device;
    activating a group session corresponding to the group identification code;
    collecting communications among members of the group during the group session;
    expiring activation of the group session;
    identifying exemplary communications from the collected communications for inclusion in the rich media visitor log;
    selecting rich media display assets corresponding to the identified exemplary communications; and
    producing a rich media visitor log comprising the identified exemplary communications and the selected corresponding rich media display assets;
    wherein sequential identification codes are not assigned to successive groups of the groups of visitors to the recreational venue, thereby preventing one to anticipate the group identification code assigned to the group.

12. The method of claim 11, wherein the rich media display assets corresponding to the identified exemplary communications comprise a video clip.

13. The method of claim 11, wherein the rich media display assets corresponding to the identified exemplary communications comprise an audio clip.

14. The method of claim 11, wherein the rich media display assets corresponding to the identified exemplary communications comprise rich media content produced by a local services network associated with a venue.

15. The method of claim 14, wherein the method provides a rich media visitor log commemorating a group visit to the venue.

16. The method of claim 14, wherein the venue is a theme park.

17. The method of claim 14, wherein the venue is a destination resort.

18. The method of claim 11, wherein the rich media display assets corresponding to the identified exemplary communications comprise rich media content produced by members of the group.

19. The method of claim 11, further comprising hosting the rich media visitor log for display to members of the group after expiration of the group session.

20. The method of claim 19, wherein the rich media visitor log is hosted as a web page.

21. The system of claim 1, wherein the identification code assigned to the group is the same code received from each of the first mobile communication device and the second mobile communication device by the group management application.

22. The system of claim 21, wherein the group management application assigns the first mobile communication device and the second mobile communication device to the same group based on receiving the same code from both the first mobile communication device and the second mobile communication device.

23. The method of claim 11 further comprising:
receiving a second message including the same group identification code from a second mobile communication.

24. The method of claim 23 further comprising:
assigning the mobile communication device and the second mobile communication device to the same group based on receiving the same group identification code from both the mobile communication device and the second mobile communication device.

* * * * *